(12) United States Patent
Andrew (10) Patent No.: US 10,967,692 B1
(45) Date of Patent: Apr. 6, 2021

(54) COMBINATION AUTOMOBILE HELICOPTER

(71) Applicant: John Robert Andrew, Spartanburg, SC (US)

(72) Inventor: John Robert Andrew, Spartanburg, SC (US)

( * ) Notice: Subject to any disclaimer, the term of this patent is extended or adjusted under 35 U.S.C. 154(b) by 0 days.

(21) Appl. No.: 16/732,473

(22) Filed: Jan. 2, 2020

(51) Int. Cl.
| | |
|---|---|
| B64C 37/00 | (2006.01) |
| B60F 5/02 | (2006.01) |
| B64C 27/78 | (2006.01) |
| B64C 27/06 | (2006.01) |
| B64C 27/02 | (2006.01) |
| B64C 27/12 | (2006.01) |

(52) U.S. Cl.
CPC .............. *B60F 5/02* (2013.01); *B64C 27/022* (2013.01); *B64C 27/06* (2013.01); *B64C 27/12* (2013.01); *B64C 27/78* (2013.01); *B64C 37/00* (2013.01)

(58) Field of Classification Search
CPC . B60F 5/02; B64C 37/00; B64C 27/78; B64C 27/12; B64C 27/022; B64C 27/06; B64C 1/063; B60P 3/42
See application file for complete search history.

(56) References Cited

U.S. PATENT DOCUMENTS

| | | | | | |
|---|---|---|---|---|---|
| 2,174,946 | A | * | 10/1939 | Ray .......................... | B64C 27/00 244/17.17 |
| 2,424,769 | A | * | 7/1947 | Page ........................ | B64C 37/00 416/143 |
| 2,509,095 | A | * | 5/1950 | Fulton, Jr. ................ | B64C 37/00 244/2 |
| 2,619,184 | A | * | 11/1952 | Hall ......................... | B64C 37/00 180/54.1 |
| 3,112,088 | A | * | 11/1963 | Speechley ................ | B64C 27/04 244/2 |
| 3,116,896 | A | * | 1/1964 | Sigler ...................... | B64C 37/00 244/2 |
| 5,915,649 | A | * | 6/1999 | Head ........................ | B64C 37/00 244/17.17 |
| 7,815,144 | B2 | * | 10/2010 | Molnar ................... | B64C 35/008 244/17.11 |

* cited by examiner

*Primary Examiner* — Medhat Badawi
*Assistant Examiner* — Vicente Rodriguez
(74) *Attorney, Agent, or Firm* — J. Bennett Mullinax LLC (57) ABSTRACT

An automobile equipped with helicopter flight apparatus capable of travel on public roads or flight in any direction. The conversion from ground travel mode to flight mode and vis-versa is automatic.

6 Claims, 7 Drawing Sheets

COMBINATION AUTOMOBILE HELICOPTER

BACKGROUND

Helicopter type vehicles capable of vertical takeoff and landing as well as travel on roads have been proposed but none are of wide spread use. One such transport vehicle has counter rotating rotor blades, each of which fold in half. Far more complicated than the design offered herein. Another combination automobile-helicopter has two engines increasing complexity. Other vehicles of this type require manual conversion from ground travel to flight while the present vehicle converts from ground mode to flight mode and vise-versa automatically.

SUMMARY OF THE INVENTION

A primary object of the invention is to combine a conventional automobile and conventional helicopter with minimum modifications to both road and flight vehicles. A secondary objective is that said vehicle's rotor column axis be fixed and not hinged and that the tail boom be fixed and not hinged.

A combination automobile-helicopter having: an engine, power train to road wheels, steering system, brake system, brake pedal, accelerator system, accelerator pedal, steering wheel suitably combined with conventional helicopter apparatus including; said engine, power train to main rotor operationally equipped with power train to tail rotor blades and flight controls, said combined automobile-helicopter having an overall height less than 10 feet suitable for driving on public roads when said main rotor blades are stowed in road mode.

A selector switch activates road mode or helicopter mode. Beginning in road mode with engine running said switch command changed from flight mode to road mode. A wing, supporting subject vehicles rotor blades is lowered. Next each rotor blade pivotally connected to the rotor hub is rotated in a horizontal plane, by an actuator from stowage position to normal helicopter radial position. The subject vehicle driver remains seated as he becomes pilot of conventional helicopter flight apparatus. Rotor column rotation brake is released and rotor column clutch is closed. Power from the single engine is now diverted from the rear road wheels to the helicopter rotor column and tail rotor upon which subject vehicle is in road mode.

Driver-pilot moves his feet from the accelerator and brake pedals, up a few inches to conventional right and left helicopter pedals. Moving the right helicopter pedal forward increases tail rotor blade angle of attack and anti-torque thrust increases. Moving the left helicopter pedal forward decreases tail rotor blade angle of attack and anti-torque thrust decreases.

Said driver-pilots left hand grips a conventional helicopter collective pitch control lever handle. Lifting said lever handle increases rotor blade angle of attack and hence rotor lift force. Lowering said lever reduces rotor blade angle of attack and rotor lift force. Engine speed is controlled by rotating the conventional helicopter left hand collective pitch control lever handle.

Driver-pilot's steering wheel is now disconnected from said vehicle's front road wheels and is in flight mode. Rotating said driver-pilot's wheel clockwise moves a first series of levers and links connected to conventional helicopter cyclic pitch control on said rotor column directing rotor thrust and flight in the starboard direction. Rotating said driver-pilot's wheel anticlockwise causes rotor thrust and flight to the port direction. Pushing said driver-pilot's steering wheel forward moves a second series of levers and links connected to a conventional helicopter cyclic pitch control apparatus directing rotor thrust and flight to the forward direction. Pulling the steering wheel backward moves said conventional cyclic pitch control apparatus directing rotor thrust and flight in the aft direction.

BRIEF DESCRIPTION OF THE DRAWINGS

The invention as to organization and method of operation may best be understood by reference to the following description taken in conjunction with the claims and the accompanying drawings in which:

DETAILED DESCRIPTION OF THE DRAWINGS

Turning now descriptively to the drawings, in which similar reference characters denote similar elements throughout the several views.

Figure 1:
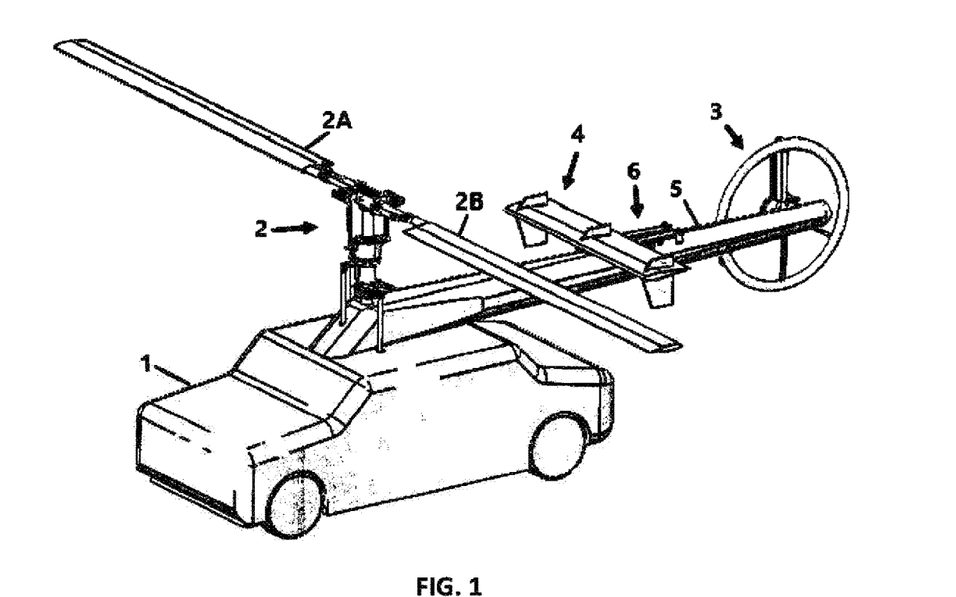
FIG. 1 is a perspective view of the subject vehicle in helicopter mode.
Figure 2:
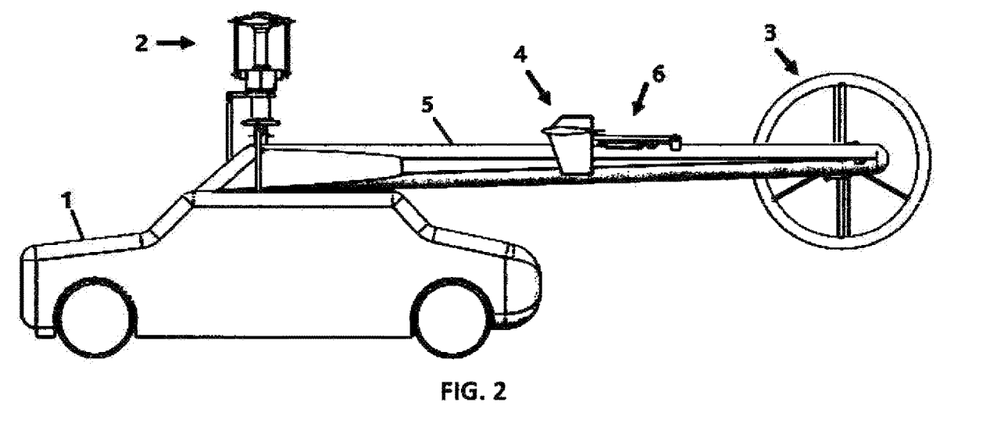
FIG. 2 is a side view of the subject vehicle in helicopter mode.

FIGS. 1 and 2 show the subject vehicle in flight mode, a conventional automobile 1 is combined with conventional helicopter apparatus including a main rotor 2 said main rotor 2 operational with rotor blades 2A and 2B and a torque balancing tail rotor 3, wing 4 is lowered by apparatus 6 to the top of tail boom 5.

Figure 3:
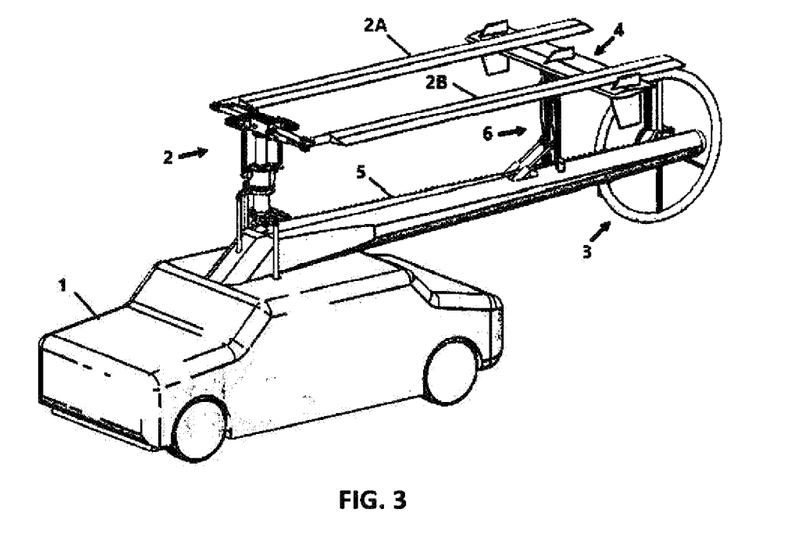
FIG. 3 is a perspective view of the subject vehicle in road mode.
Figure 4:
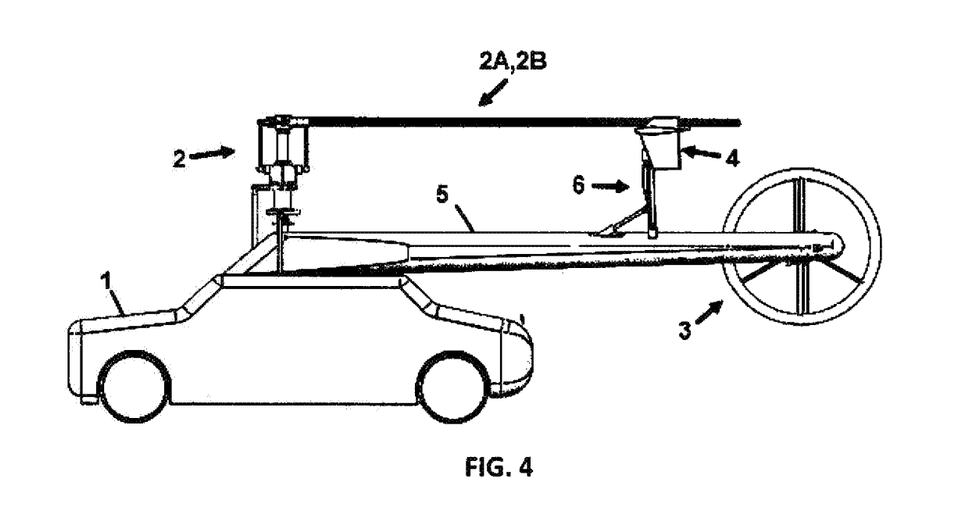
FIG. 4 is a side view of the subject vehicle in road mode.

FIGS. 3 and 4 show the subject vehicle in road mode with rotor blades 2A and 2B pivoted to the aft of subject vehicle where they lay on supporting wing 4.

Figure 5:
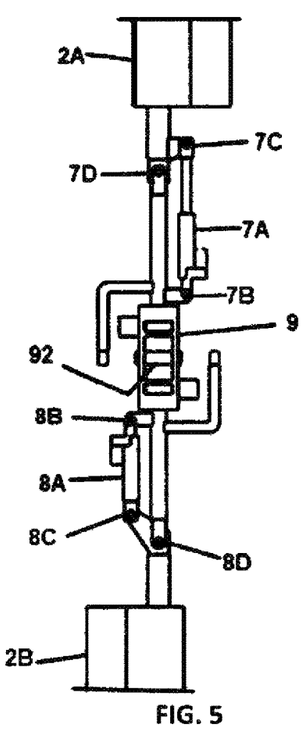
FIG. 5 is a plan view of the subject vehicle helicopter equipped with 2 rotor blades hinged to normal radial helicopter orientation.

Main Rotor Blades in Flight Mode to FIG. 5 rotor blades 2A and 2B are in fully extended orientation for flight, actuator 7A is pivotally connected near hub 9 at pin 7B and rotor 2A is pivotally connected at 7D, said actuator is fully extended and locked preventing rotor blade 2A from rotating about hinge pin 7D. Said actuator is of worm and wheel type, electrically powered to extend or retract. When electric power is turned off said actuator is locked and will not extend or retract. Hub 9 is pivotally connected to pin 92.

Main Rotor Blades in Road Mode

Figure 6A:
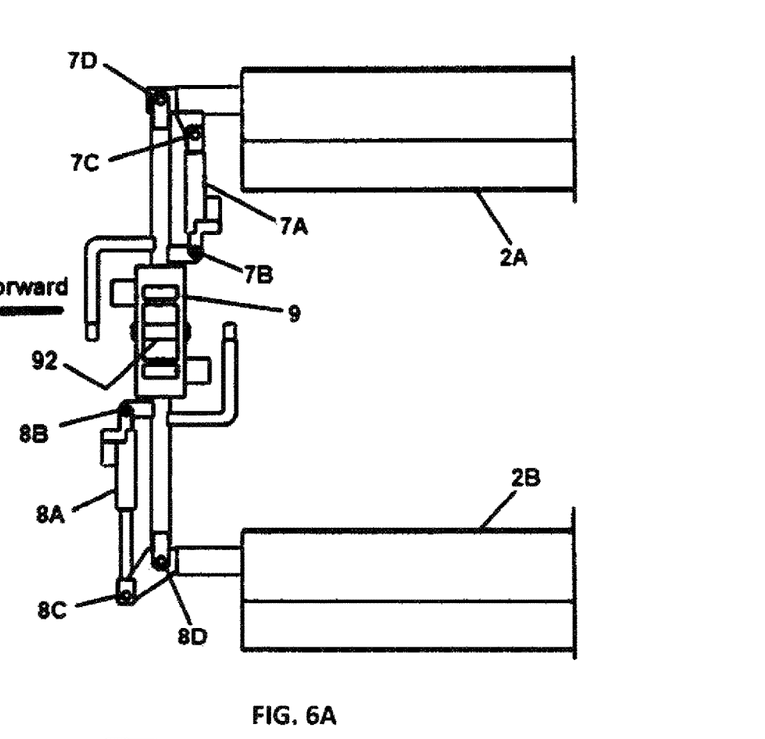
FIG. 6A is a plan view of the subject vehicle helicopter equipped with 2 rotor blades hinged through 90 degrees rotation in road mode.

FIG. 6A rotor blades 2A and 2B are in fully rotated orientation for travel on roads, short actuator 7A is pivotally connected near hub 9 at pin 7B and pivotally connected to rotor 2A at 7C, said actuator is fully retracted and locked preventing rotor blade 2A from rotating about hinge pin 7D. Long actuator 8A is pivotally connected near hub 9 at pin 8B and pivotally connected at rotor 2B at 8C, said actuator is fully extended and locked preventing rotor blade 2B from rotating about hinge pin 8D.

Figure 6B:
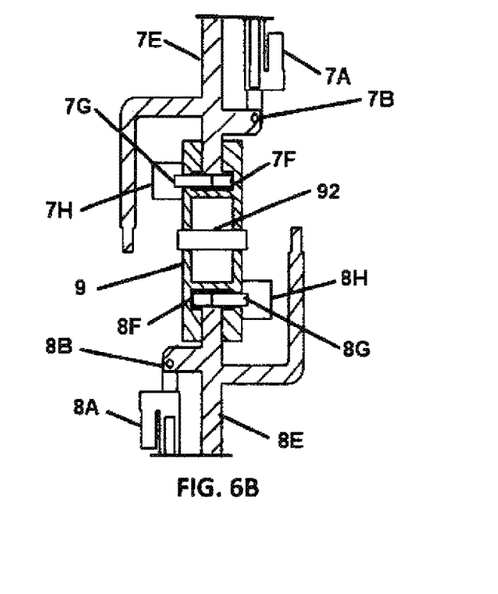
FIG. 6B is a sectional view of the hub portion 9 seen in FIG. 6A.

FIG. 6B is a section view at a horizontal plane through hub 9. Rod 7E is rotatable in a hole in hub 9. The inboard end of rod 7E is of larger diameter 7F and is confined in a slot in hub 9. Larger rod 7F has a transverse hole presently in alignment with a transverse hole in hub 9. Armature 7G of solenoid 7H is in alignment with said holes in larger rod 7F and hub 9. Armature 7G is extended into said holes in hub 9 and larger rod 7F preventing rod 7E from rotating. Rotor blade 2A may now be rotated about pin 7D by actuator 7A retracting which would cause rotor blade 2A to rotate from flight mode FIG. 5 to road mode FIG. 6A. Actuator 7A extending would cause rotor blade 2A to rotate from road mode FIG. 6A to flight mode FIG. 5.

Engine Drive Train in Road Mode

Figure 7:
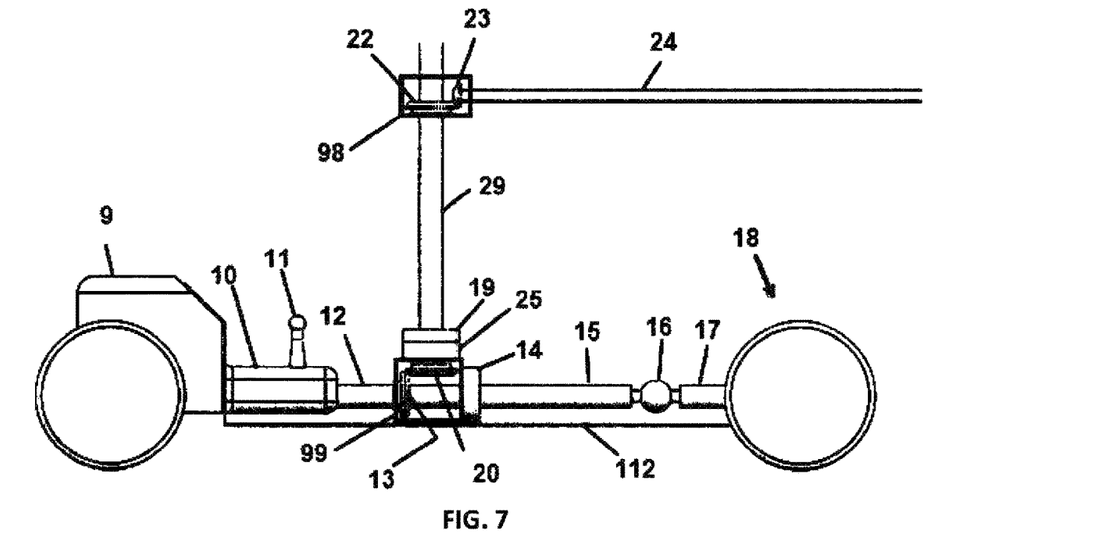
FIG. 7 is a side view of the subject vehicle drive train.

FIG. 7 subject vehicle drive train: engine 9, gearbox 10, gear shift lever 1t forward drive shaft 12, bevel gear 13 rigidly attached to drive shaft 12, clutch 14, middle drive shaft 15, universal joint 16, aft drive shaft 17, differential gears not shown, left and right rear wheels and axles 18. Clutch 19 is open disconnecting bevel gear 20 from vertical rotor column 29. Clutch 14 is closed joining forward drive column 12 to middle drive column 15 and the two aft road wheels 18. Item 112 is subject vehicles floor.

Engine Drive Train in Flight Mode

FIG. 7 engine 9, gearbox 10, gear shift lever 11, forward drive shaft 12, bevel gear 13 rigidly attached to drive shaft 12, clutch 14 is open disconnecting aft drive shaft 15 from forward drive shaft 12. Clutch 19 is closed connecting bevel gear 20 to vertical rotor column 29, bevel gear 22 rigidly attached to rotor column 29 meshes with bevel gear 23, and tail rotor drive shaft 24 is rigidly attached to tail rotor drive bevel gear 23.

Main Rotor Column Position Lock in Road Mode

Figure 8A:
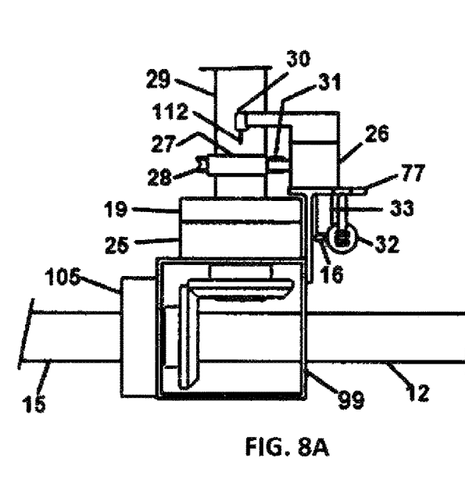
FIG. 8A is a side view of the rotor column rotation lock.

FIG. 8A is a side view of the main rotor column position lock. Rotor blades 2A and 2B are stowed in road mode as shown in FIG. 3 and FIG. 4. Rotor column 29 is disengaged from engine drive shaft 12 by opening clutch 25 and rotor column 29 rotation is stopped by closing brake 19. Next electric motor 26 pivotally mounted on bracket 77 causes rotor column 29 to rotate by meshing with worm gear 27 rigidly attached to motor shaft 31 engages worm wheel 28 causing rotor column 29 to rotate. Tab 112 rigidly attached to rotor column 29, rotates with rotor column 29. When tab 112 is detected by proximity switch 30 a signal is transmitted to stop motor 26 causing rotor column 29 rotation to stop. Rotor column 29 is now rotated to the correct angle required for rotor blades 2A and 2B to begin rotating into stowing mode as shown in FIG. 5 and FIG. 6 respectively.

Main Rotor Column Position Lock in Flight Mode

Figure 8B:
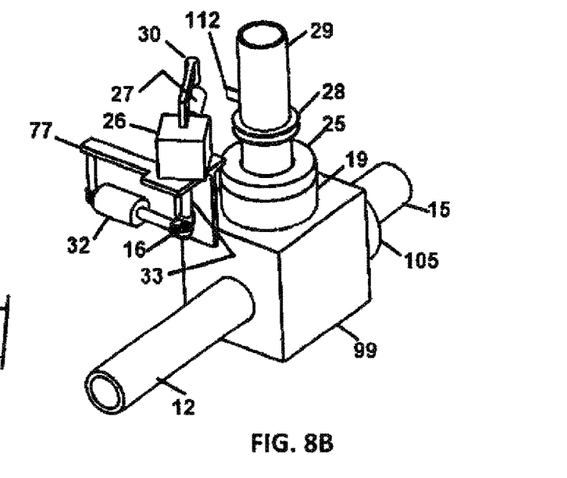
FIG. 8B is a perspective view of the rotor column rotation lock open, allowing rotation.

FIG. 8B is a perspective view of the main rotor column position lock in flight mode. Actuator 32 is pivotally connected to lever 16. Lever 16 is rigidly connected to motor 26 pivot shaft 33. Driver-pilot control selector switch (not shown) has been set to flight mode causing actuator 32 to extend. Said extension causes motor 26 and worm gear 27 to rotate away from worm wheel 28. Rotor column 29 is now free to rotate in flight mode.

Steering Control

Figure 9:
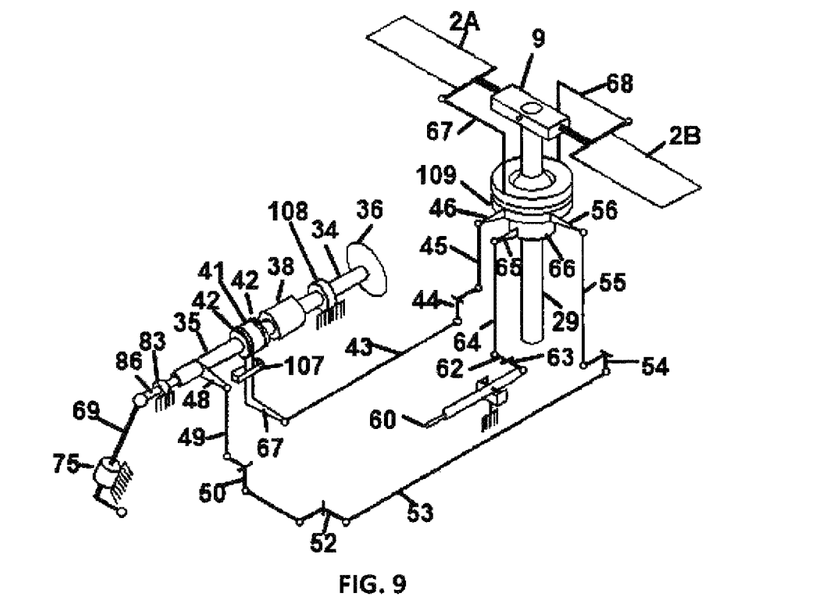
FIG. 9 is a schematic view of the subject vehicle steering control system.

FIG. 9 is a combined automobile-helicopter steering system schematic configured in the present invention for travel on roads or for flight. Steering wheel 36 is is rigidly attached to the aft end of tube 34 and aft end of clutch 38. Tube 34 is free to rotate in bearing 108. Rod 86 is attached to the forward end of clutch 38. Clutch 38 connects tube 34 and steering wheel 36 to rod 86 while driving on roads. Rod 86 is free to rotate in bearing 83. Clutch 38 connects steering wheel 36 to tube 35 in flight mode. Tube 35 passes through ring 41. Ring 41 is rigidly attached to the top of L-bar 67. Two flanges 107 on either side of ring 41 are rigidly attached to tube 35. All connections between, bell cranks and links are universal joints. Forward movement of steering wheel 36 moves L-bar 67 a corresponding linear distance within fixed guide 107. Link 43 connects the bottom end of L-bar 67 to the vertical arm of bell crank 44.

Link 45 connects the horizontal arm of crank 44 to lever 46, said lever 46 is rigidly attached to the forward side of cyclic control ring 109. Forward movement of steering wheel 36 cause's lever 46 to move down and cyclic pitch control to tilt rotor thrust in the forward flight direction. It follows that moving steering wheel 36 in the aft direction will tilt rotor cyclic control 109 and rotor thrust in the aft flight direction.

Lever 48 is rigidly attached to tube 35. When clutch 38 connects tube 34 to tube 35, clockwise rotation of steering wheel 36 cause a corresponding rotation of lever 48 and movement upward of link 49, anti-clockwise rotation of bell crank 50, movement starboard of link 51, rotation clockwise of bell crank 52, movement forward of link 53, rotation clockwise of bell crank 54, upward movement of link 55 and upward movement of lever 56. Said movement of lever 56 causes cyclic pitch control 109 to tilt rotor thrust in the starboard flight direction.

It follows that rotating the steering wheel 36 in the anti-clockwise direction will tilt rotor thrust in the port flight direction.

Vertical Flight Control

Vertical flight control is that of a conventional helicopter. Rotor thrust control lever 57 pivots in universal joint 59. When throttle control hand grip 60 is rotated in a first direction, engine speed and rotor speed increases. Rotating throttle control hand grip 60 in the opposite direction causes engine and rotor speed to decrease. Moving hand grip 60 upward causes the forward end of lever 57 to rotate about universal joint 59. Said rotation causes the connection 61 at the aft end of lever 57 to move downward, lever 62 to rotate clockwise about, pin 63, link 64 to move upward, lever 65 to move upward, collective pitch unit 66 to move upward and rotor pitch angle L-link 67 and L-link 68 to move upward increasing the angle of attack of rotor blades 2A and 2B respectively.

It follows that moving hand grip 60 downward will cause the angle of attack of rotor blades 2A and 2B to decrease.

Figure 10:
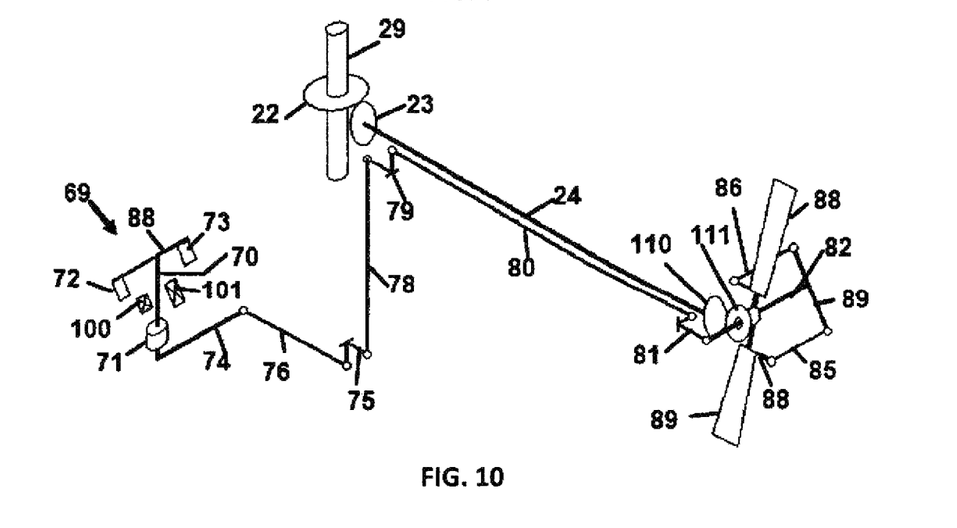
FIG. 10 is a schematic view of the subject vehicle conventional helicopter tail rotor control system and automobile brake and accelerator pedals.

FIG. 10 is a schematic of the conventional helicopter tail rotor control system used by subject vehicle. All connections between bell cranks and links are universal joints.

T-bar 70 pivots in bearing 71. Lever 74 is rigidly attached to the bottom of T-bar one 70. A left foot pedal 72 and a right foot pedal 73 are rigidly attached to top bar 88 on the left and right ends respectively. When foot pedal 73 moves forward lever 74 rotates anti-clockwise, link 76 moves forward, bell crank 75 rotates clockwise, link 78 moves downward, bell crank 79 rotates anti-clockwise, link 80 moves forward. Said movement of link 80 causes bell crank 81 to rotate clockwise, rod 82 of T-bar 89 moves starboard, cross bar of T-bar 89 moves starboard. Links 85 and 86 connected to two levers 88 move forward, tail rotor blades 88 and 89 increase their angles of attack and increase thrust in the starboard direction.

Figure 11A:
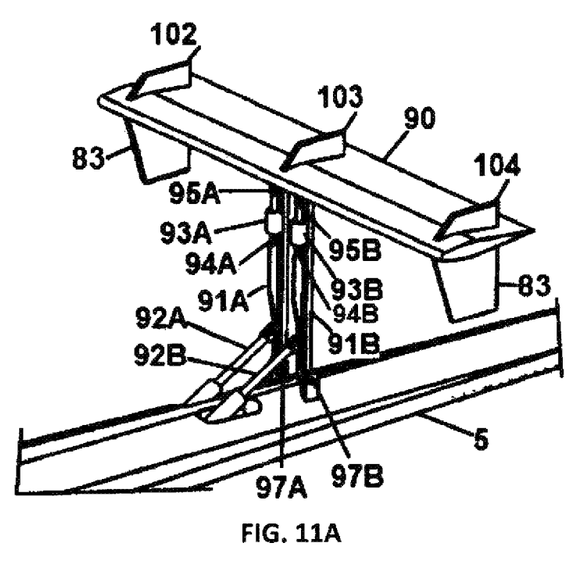
FIG. 11A is a view of the subject vehicle aft wing in stowed mode position.

FIG. 11A is a perspective view of wing 90 in stowed mode. Fins 102, 103 and 104 are fixedly attached to the top surface of wing 90. Fins 83 are fixedly attached to the bottom surface of wing 90. The top of arm 91A is pivotally connected to wing 90 (not shown) and at the bottom end of arm 91A is pivotally connected to lug 97A. Lug 97 is fixedly connected to tail boom 5. Actuator 93A is pivotally connected to arm 91A at 94A and to wing 90 at 95A. The aft end of actuator 92A is pivotally connected to arm 91A at 97A and, pivotally connected to tail boom 5 at its forward end (not shown).

The top of arm 91B is pivotally connected to wing 90 (not shown) and pivotally connected at the bottom end of arm 91B is pivotally connected to lug 97B, Lug 97 is fixedly connected to tail boom 5. Actuator 93B is pivotally connected to arm 91B at 94B and to wing 90 at 95B. The aft end of actuator 92B is pivotally connected to arm 91B at 97B and pivotally connected to tail boom 5 at its forward end (not shown).

Figure 11B:
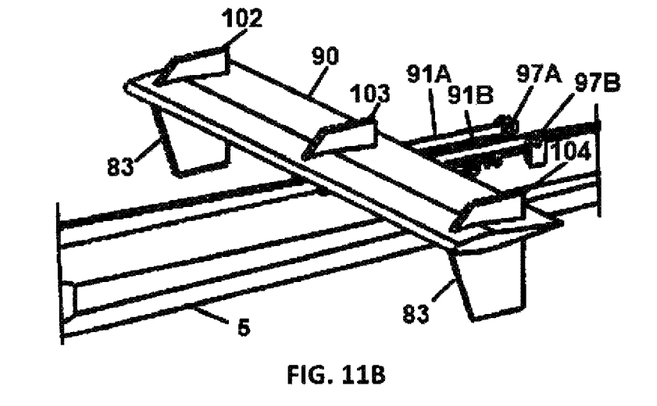
FIG. 11B is a view of the subject vehicle aft wing in flight mode position.

FIG. 11B is a perspective view of wing 90 in flight mode. Actuators 93A and 93B have fully extended rotating wing 90 degrees clockwise and actuators 92A and 92B have fully retracted. Arms 91A and 91B have rotated Wing 90 and arms 91A and 91B approximately 90 degrees counter clockwise so that wing 90 is near the top surface of tail boom 5.

Figure 12A:
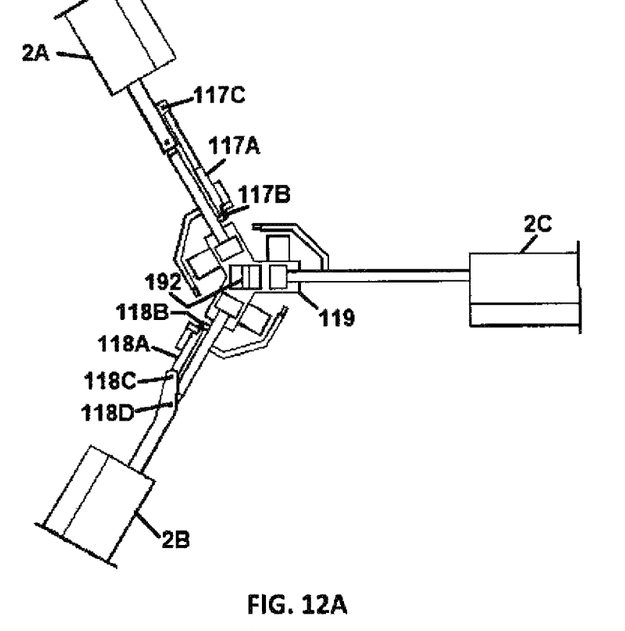
FIG. 12A is a plan view of the subject vehicle helicopter equipped with 3 rotor blades hinged to normal radial helicopter orientation.

FIG. 12A rotor blades 2A, 2B and 2C are in fully extended orientation for flight, actuator 117A is pivotally connected near hub 119 at pin 117B and rotor 2A is pivotally connected at 117D, said actuator is fully extended and locked preventing rotor blade 2A from rotating about hinge pin 117D Said actuator is of worm and wheel type, electrically powered to extend or retract. When electric power is turned off said actuator is locked and will not extend or retract. Hub 119 is pivotally connected to pin 192.

Main Rotor Blades in Road Mode

Figure 12B:
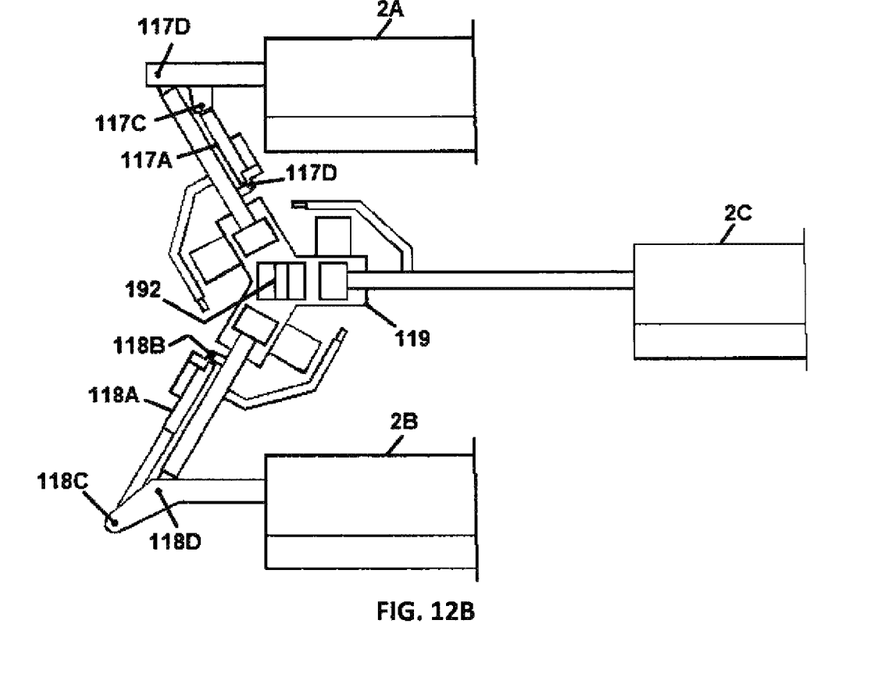
FIG. 12B is a plan view of the subject vehicle helicopter equipped with 3 rotor blades hinged through 90 degrees rotation in road mode.

FIG. 12B rotor blades 2A and 2B are in fully rotated orientation for travel on roads, actuator 117A is pivotally connected near hub 119 at pin 117O and pivotally connected to rotor 2A at 117O, said actuator is fully retracted and locked preventing rotor blade 2A from rotating about hinge pin 117D. Actuator 118A is pivotally connected near hub 119 at pin 118B and pivotally connected at rotor 2B at 118C, said actuator is fully extended and locked preventing rotor blade 2B from rotating about hinge pin 118D.

While certain novel features of this invention have been shown, described and pointed out in the annexed claims, it will be understood that various omissions and changes in the forms and details of the device illustrated and in its operation can be made by those skilled in the art without departing from the spirit of the invention.

Having thus made a full disclosure of the preferred embodiments of the invention, reference is directed to the appended claims:

I claim:

1. A combination automobile helicopter vehicle comprising:
    an automobile having an engine;
    a first rotor blade and a second rotor blade, each rotor blade spaced apart on a side of a hub, the first and second rotor blades are substantially parallel to a horizontal plane defined by a top of the automobile, the hub in rotational communication with a rotor column, the rotor column defining a longitudinal axis which is substantially perpendicular to the horizontal plane;
    a first pivot mechanism and a second pivot mechanism connecting the first rotor blade and the second rotor blade to the hub and allowing each of the first and second rotor blades to pivot between a drive position where the first rotor blade and the second rotor blade are positioned parallel to an axis defined by a length of the automobile and a second position where the first rotor blade and the second rotor blade extend in a flight position having a positional angle up to 90 degrees relative to the drive position;
    a braking mechanism operatively engaging the rotor column;
    a clutch mechanism for engaging, and disengaging a gear mechanism that engages the rotor column from a disengaged engine positioned to an engaged position which powers a rotational force to the rotor column;
    a steering wheel rigidly attached to a first end of a tube, a second end of the tube rigidly attached to a clutch wherein the tube is free to rotate in a first bearing when a first end of a steering rod is inserted inside the clutch and extends near an aft end of the clutch, the steering rod extending forward and passing through and beyond a second bearing, a second end of the steering rod is operationally connected to the steering wheel, the steering rod is situated inside a second tube extending near a forward end of the clutch, an opposite end of the second tube extending forward to the second bearing, the clutch is connectable to the steering rod in a road mode and the clutch connectable to the second tube when in a flight mode;
    a drive shaft extending from the bevel gear to a tail rotor bevel gear in operable engagement with a tail rotor;
    wherein the combination automobile helicopter vehicle in a road mode is convertible to a flight mode upon selective disengagement of a drive train of the automobile and engagement of the rotor column.

2. A combination automobile helicopter vehicle comprising:
    an automobile having an engine;
    a first rotor blade and a second rotor blade, each rotor blade spaced apart on a side of a hub, the first and second rotor blades are substantially parallel to a horizontal plane defined by a top of the automobile, the hub in rotational communication with a rotor column, the rotor column defining a longitudinal axis which is substantially perpendicular to the horizontal plane;
    a first pivot mechanism and a second pivot mechanism connecting the first rotor blade and the second rotor blade to the hub and allowing each of the first and second rotor blades to pivot between a drive position where the first rotor blade and the second rotor blade are positioned parallel to an axis defined by a length of the automobile and a second position where the first rotor blade and the second rotor blade extend in a flight position having a positional angle up to 90 degrees relative to the drive position;

a braking mechanism operatively engaging the rotor column;

a clutch mechanism for engaging and disengaging a gear mechanism that engages the rotor column from a disengaged engine positioned to an engaged position which powers a rotational force to the rotor column;

a steering wheel rigidly attached to a first end of a tube, a second end of the tube rigidly attached to a clutch wherein the tube is free to rotate in a first bearing when a first end of a steering rod is inserted inside the clutch and extends near an aft end of the clutch, the steering rod extending forward and passing through and beyond a second bearing, a second end of the steering rod is operationally connected to the steering wheel, the steering rod is situated inside a second tube extending near a forward end of the clutch, an opposite end of the second tube extending forward to the second bearing, the clutch is connectable to the steering rod in a road mode and the clutch connectable to the second tube when in a flight mode;

a drive shaft extending from the bevel gear to a tail rotor bevel gear in operable engagement with a tail rotor;

a wing positioned between the rotor and the tail rotor and supported by a tail boom, the wing in mechanical communication with a wing actuator which can vary a height of the wing relative to the tail boom;

wherein the combination automobile helicopter vehicle in a road mode is convertible to a flight mode upon selective disengagement of a drive train of the automobile and engagement of the rotor column.

3. A combination automobile helicopter vehicle comprising:

an automobile having an engine;

a first rotor blade and a second rotor blade, each rotor blade spaced apart on a side of a hub, the first and second rotor blades are substantially parallel to a horizontal plane defined by a top of the automobile, the hub in rotational communication with a rotor column, the rotor column defining a longitudinal axis which is substantially perpendicular to the horizontal plane;

a first pivot mechanism and a second pivot mechanism connecting the first rotor blade and the second rotor blade to the hub and allowing each of the first and second rotor blades to pivot between a drive position where the first rotor blade and the second rotor blade are positioned parallel to an axis defined by a length of the automobile and a second position where the first rotor blade and the second rotor blade extend in a flight position having a positional angle up to 90 degrees relative to the drive position;

a braking mechanism operatively engaging the rotor column;

a clutch mechanism for engaging and disengaging a gear mechanism that engages the rotor column from a disengaged engine positioned to an engaged position which powers a rotational force to the rotor column;

a steering wheel rigidly attached to a first end of a tube, a second end of the tube rigidly attached to a clutch wherein the tube is free to rotate in a first bearing when a first end of a steering rod is inserted inside the clutch and extends near an aft end of the clutch, the steering rod extending forward and passing through and beyond a second bearing, a second end of the steering rod is operationally connected to the steering wheel, the steering rod is situated inside a second tube extending near a forward end of the clutch, an opposite end of the second tube extending forward to the second bearing, the clutch is connectable to the steering rod in a road mode and the clutch connectable to the second tube when in a flight mode;

a drive shaft extending from the bevel gear to a tail rotor bevel gear in operable engagement with a tail rotor;

a wing positioned between the rotor and the tail rotor and supported by a tail boom, the wing in mechanical communication with a wing actuator which can vary a height of the wing relative to the tail boom;

a plurality of spaced fins carried on a top surface of the wing, the first rotor blade and the second rotor blade are supported on the top surface of the wing and between a corresponding pair of spaced fins when the vehicle is in a road mode;

wherein the combination automobile helicopter vehicle in a road mode is convertible to a flight mode upon selective disengagement of a drive train of the automobile and engagement of the rotor column.

4. The combination automobile helicopter vehicle according to claim 1 wherein a third rotor blade is attached to the hub and coplanar with the first and second rotor blades, the first, second, and third rotor blades are positioned 120° from the respective adjacent blades and are substantially parallel to the axis defined by the length of the automobile when in a drive position.

5. The combination automobile helicopter vehicle according to claim 2 wherein a third rotor blade is attached to the hub and coplanar with the first and second rotor blades, the first, second, and third rotor blades are positioned 120° from the respective adjacent blades and are substantially parallel to the axis defined by the length of the automobile when in a drive position.

6. The combination automobile helicopter vehicle according to claim 3 wherein a third rotor blade is attached to the hub and coplanar with the first and second rotor blades, the first, second, and third rotor blades are positioned 120° from the respective adjacent blades and are substantially parallel to the axis defined by the length of the automobile when in a drive position.

* * * * *